(12) United States Patent
Hsu

(10) Patent No.: US 9,452,552 B2
(45) Date of Patent: Sep. 27, 2016

(54) PRESSURE-CONTROLLING FOAM MOLDING METHOD

(75) Inventor: Sheng-Tzu Hsu, Taipei (TW)

(73) Assignee: KING STEEL MACHINERY CO., LTD., Taichung (TW)

(*) Notice: Subject to any disclaimer, the term of this patent is extended or adjusted under 35 U.S.C. 154(b) by 428 days.

(21) Appl. No.: 13/594,642

(22) Filed: Aug. 24, 2012

(65) Prior Publication Data
US 2014/0001668 A1  Jan. 2, 2014

(30) Foreign Application Priority Data

Jun. 28, 2012 (TW) ............................. 101123293 A
Jun. 28, 2012 (TW) ............................. 101212488 U

(51) Int. Cl.
| | | |
|---|---|---|
| B29C 67/20 | (2006.01) | |
| B29C 33/00 | (2006.01) | |
| B29C 44/00 | (2006.01) | |
| B29D 35/12 | (2010.01) | |
| B29C 44/08 | (2006.01) | |
| B29C 44/10 | (2006.01) | |
| B29D 35/00 | (2010.01) | |

(52) U.S. Cl.
CPC ......... *B29C 33/0022* (2013.01); *B29C 44/083* (2013.01); *B29C 44/10* (2013.01); *B29C 67/2295* (2013.01); *B29D 35/128* (2013.01)

(58) Field of Classification Search
CPC ............ B29D 35/128; B29C 67/2295; B29C 44/083
USPC ..................................... 264/50, 55, 244, 321
See application file for complete search history.

(56) References Cited

U.S. PATENT DOCUMENTS

| | | | | |
|---|---|---|---|---|
| 4,314,954 | A | * | 2/1982 | Ringdal ........................ 264/45.5 |
| 4,981,634 | A | * | 1/1991 | Maus et al. .................... 264/102 |
| 5,773,049 | A | * | 6/1998 | Kashiwa et al. ............... 425/572 |
| 2006/0231976 | A1 | * | 10/2006 | Chen ............................ 264/250 |
| 2008/0111051 | A1 | * | 5/2008 | Hsu ............................... 249/112 |

* cited by examiner

*Primary Examiner* — Christina Johnson
*Assistant Examiner* — Patrick Butler

(57) ABSTRACT

A pressure-controlling foam molding method and a device thereof. The device includes a first mold and a second mold positioned on different levels. The first mold molds polymer material into a blank and is opened in a high pressure environment to limit the extent to which the molded blank foams. The foamed blank is compressed to have a volume approximately equal to or smaller than that of the second mold cavity of the second mold. Then the foamed blank is moved from the first mold pit of the first mold into the second mold pit of the second mold along a moving axis parallel to gravity line. Prior to transfer, with the plane on which the opening of the second mold pit is positioned as a projection face, the shape and position of the opening of the second mold pit correspond to vertical projective shape and position of the blank.

7 Claims, 16 Drawing Sheets

PRESSURE-CONTROLLING FOAM MOLDING METHOD

BACKGROUND OF THE INVENTION

1. Field of the Invention

The present invention relates generally to a polymer processing technique, and more particularly to a pressure-controlling foam molding method and a device thereof.

2. Description of the Related Art

Taiwanese Patent Application No. 09219239 discloses a pressure-controlling foam molding method. Taiwanese Patent Application No. 092206257 discloses a pressure-controlling foam molding device. The above patents provide an out-mold polymer foam processing technique. According to this technique, the environmental pressure condition is controlled to change the polymer foam molding process. To speak more specifically, in the technique provided by the above patents, a blank mold for molding a foam blank and a shaping mold for molding a product are side by side arranged in a closed pressure room. By means of an external pressure controlling mechanism, the internal environmental pressure of the pressure room can be changed. After the polymer material is molded into a blank by the blank mold, the blank mold is opened under a specific pressure environment provided by the pressure room. Then the molded blank is moved from the blank mold into the shaping mold within the same pressure room to perform shaping process for the blank.

Substantially, in the technique provided by the above patents, an operable transfer unit is disposed between the blank mold and shaping mold. After the blank mold is opened under the specific pressure environment, a sucker of the transfer unit sucks the blank in the blank mold. Then the transfer unit operates to move the sucked blank to the shaping mold beside the blank mold. According to the above, the blank transfer process substantially includes three steps of: first using the sucker to suck the blank and moving the blank upward from the blank mold; then horizontally transversely moving the blank to an upper side of the shaping mold in an opened state; and finally moving the blank downward and filling the blank into the mold pit of the shaping mold in an opened state.

In the technique provided by the above patents, the blank mold and the shaping mold are side by side arranged so that the blank must be transferred in the above manner. In order to ensure that the blank can be successfully filled into the mold pit of the shaping mold, a specific high pressure is applied to the blank for limiting the extent to which the blank foams. Under such circumstance, during transfer, the volume of the blank is much smaller than the capacity of the mold pit of the shaping mold, into which the blank is to be filled. Accordingly, with sufficient room in the mold pit of the shaping mold, even if the blank is displaced during transfer, the blank can be still successfully filled into the mold pit of the shaping mold. After the blank is filled into the shaping mold and the shaping mold is closed, the high pressure is relieved to foam the blank in the closed mold cavity of the shaping mold.

The above technique is applicable in the field of foam molding. However, during transfer of the blank, it is necessary to limit the extent to which the blank foams. Therefore, it is necessary to provide a high air pressure in the pressure room. The higher the air pressure value is, the larger the energy consumption is. As a result, much energy is wasted. Moreover, during transfer of the blank, the blank is permitted to slightly displace. However, the blank is first moved upward and then transversely moved and finally lowered. That is, the blank is moved in multiple directions during transfer. In this case, it is hard to control the possible displacement of the blank during transfer. As a result, it often takes place that the blank is over-displaced and fails to be filled into the shaping mold.

SUMMARY OF THE INVENTION

It is therefore a primary object of the present invention to provide a pressure-controlling foam molding method. A first mold and a second mold are positioned on different levels. The first mold is used to mold polymer material into a blank and is opened in a high pressure environment so as to limit the extent to which the molded blank foams when opening the mold. The foamed blank is compressed to have a volume approximately equal to or smaller than the capacity of the second mold cavity of the second mold, into which the foamed blank is to be filled. Then the foamed blank with the decreased volume is moved from the first mold pit of the first mold into the second mold pit of the second mold along one single moving axis in parallel to the gravity line.

It is a further object of the present invention to provide a pressure-controlling foam molding device, which is used in the above pressure-controlling foam molding method. By means of the pressure-controlling foam molding device, when transferring the molded material from one mold into another mold, the material is simply reciprocally moved along one single moving axis so as to solve the problem of the conventional technique that the material is moved in multiple directions and is likely to displace. Accordingly, it is ensured that after the material is moved out of one mold, the material can be successfully placed into another mold.

To achieve the above and other objects, the pressure-controlling foam molding method of the present invention includes steps of:

a. preparing a first mold and a second mold, wherein the first mold is a multilayer mold having at least one first mold pit for molding a blank and the second mold also is a multilayer mold having at least one second mold pit for shaping the blank;

b. using the first mold to mold at least one blank;

c. positioning the first and second molds in the same closed pressure-controlling space;

d. keeping the pressure in the pressure-controlling space a predetermined transfer pressure and under the transfer pressure environment, moving the blank out of the first mold pit of the first mold along a moving axis in parallel to gravity direction; and e. with the plane on which the opening of the second mold pit is positioned as a projection face and with the shape and position of the opening of the second mold pit corresponding to the vertical projective shape and position of the blank, moving the blank into the second mold pit along the moving axis.

The pressure-controlling foam molding device of the present invention includes: a mold seat having a housing section, an interior of the housing section being partitioned into a first receiving space and a second receiving space positioned on different levels, a lateral side of the housing section being formed with a first opening and a second opening, whereby the first and second receiving spaces communicate with the atmosphere via the first and second openings respectively; a sealing assembly having a body section for blocking the openings of the first and second receiving spaces and interrupting the communication between the first and second receiving spaces and the atmosphere, the body section having an internal communication space, when the body section blocks the openings of the receiving spaces, the receiving spaces communicating with the communication space via the openings, whereby the first and second receiving spaces communicate with each other via the communication space to form an independent closed pressure-controlling space isolated from the atmosphere; at least one first mold and at least one second mold respectively disposed in the first and second receiving spaces, each of the first and second molds having a movable mold plate, whereby when the body section of the sealing assembly blocks the openings of the first and second receiving spaces and the first and second receiving spaces communicate with each other only via the communication space, the movable mold plates are drivable by external force to reciprocally move between the receiving spaces and the communication space; and a material transfer assembly disposed on the body section and having a material picking section positioned in the communication space, the material picking section being up and down reciprocally movable in a direction in parallel to the gravity line, the positions where the movable mold plates are positioned in the communication space being within a travel range of the material picking section, whereby the material picking section can be used to pick up and transfer a material between the movable mold plates, when using the material picking section to pick up and transfer the material between the movable mold plates, the movable mold plates of the molds being positioned in the communication space and the material picking section being used to apply a force to the material in the movable mold plate of the first mold to pick up the material, then the movable mold plate of the first mold being restored from the communication space into the first receiving space, then the material picking section being moved to drive and move the picked material into the movable mold plate of the second mold.

The present invention can be best understood through the following description and accompanying drawings, wherein:

DETAILED DESCRIPTION OF THE PREFERRED EMBODIMENTS

Figure 1:
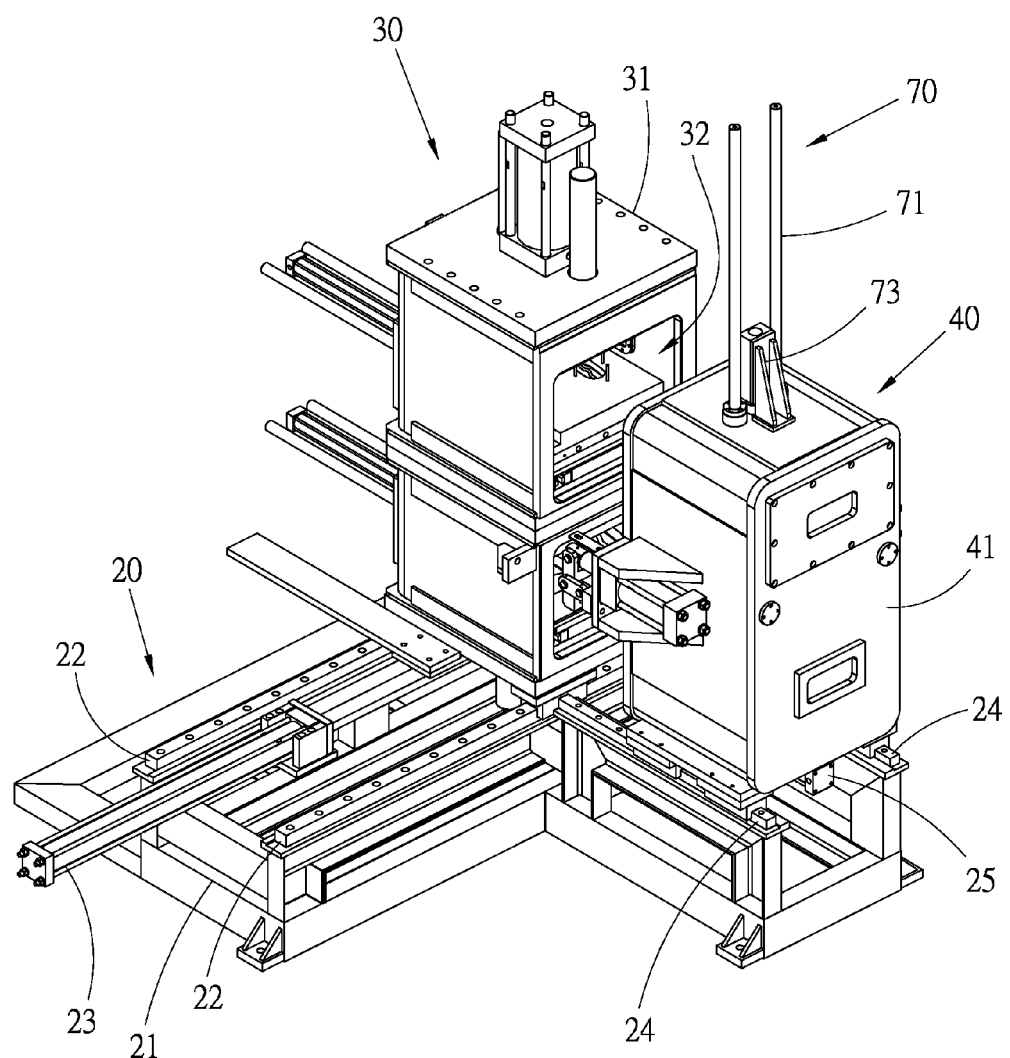
FIG. 1 is a perspective assembled view of a first embodiment of the present invention.
Figure 2:
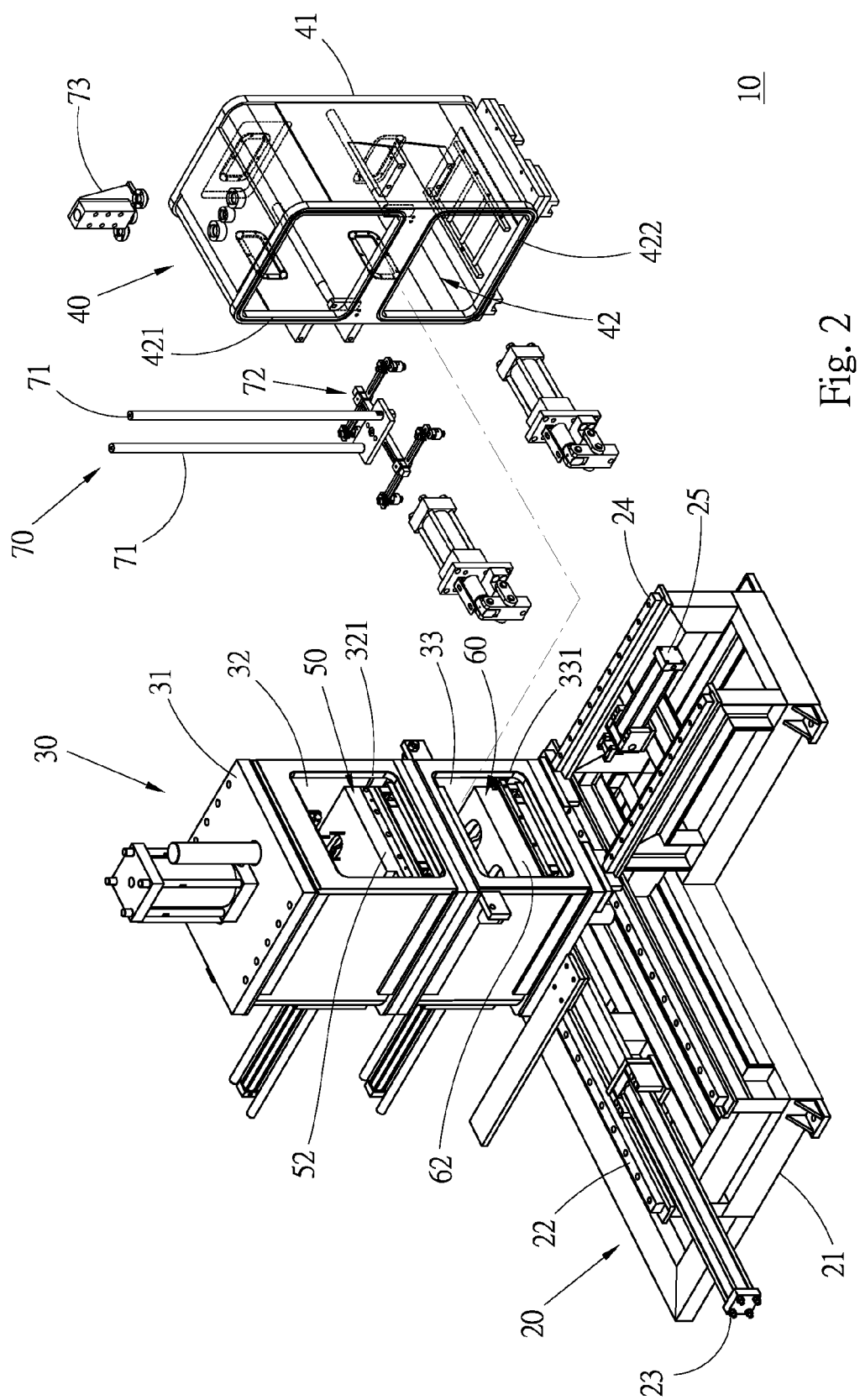
FIG. 2 is a perspective exploded view of the first embodiment of the present invention.
Figure 3:
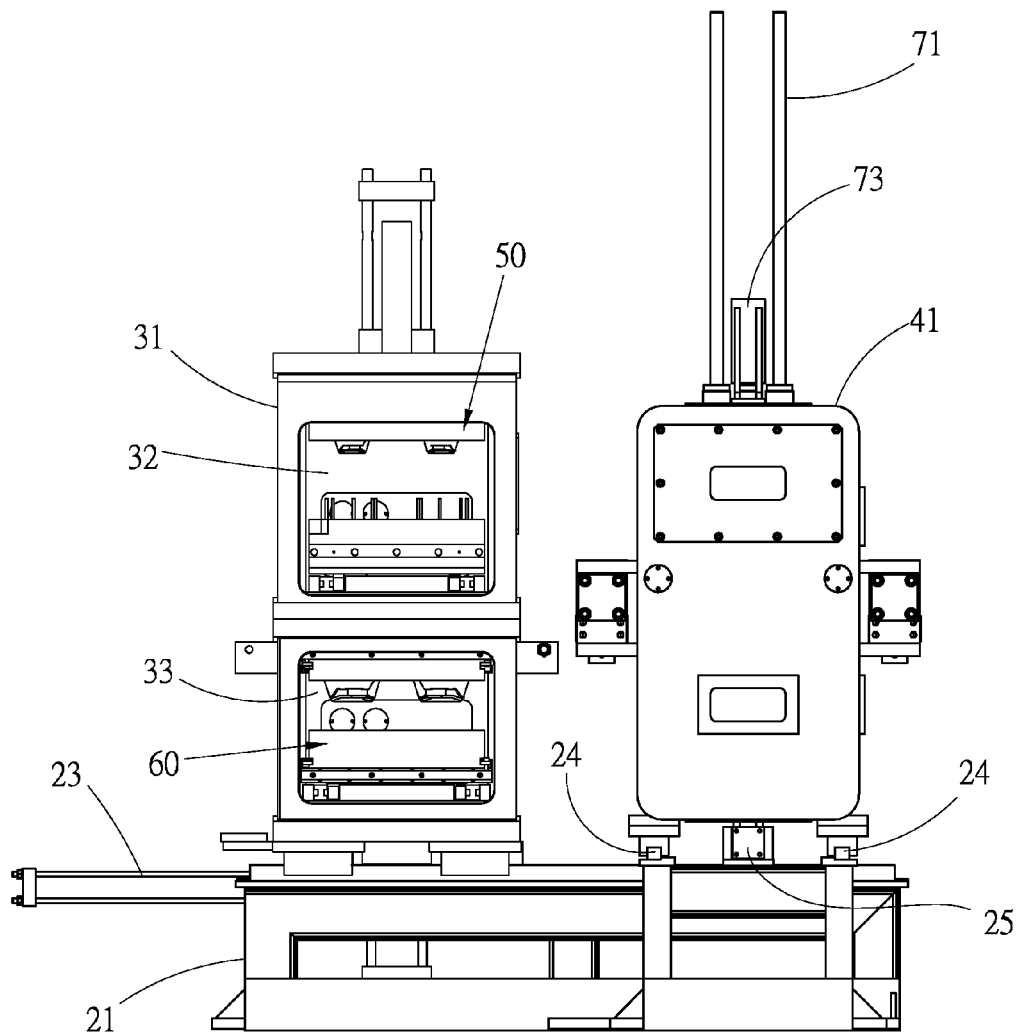
FIG. 3 is a front view of the first embodiment of the present invention, in which the housing section is positioned in the first position.
Figure 4:
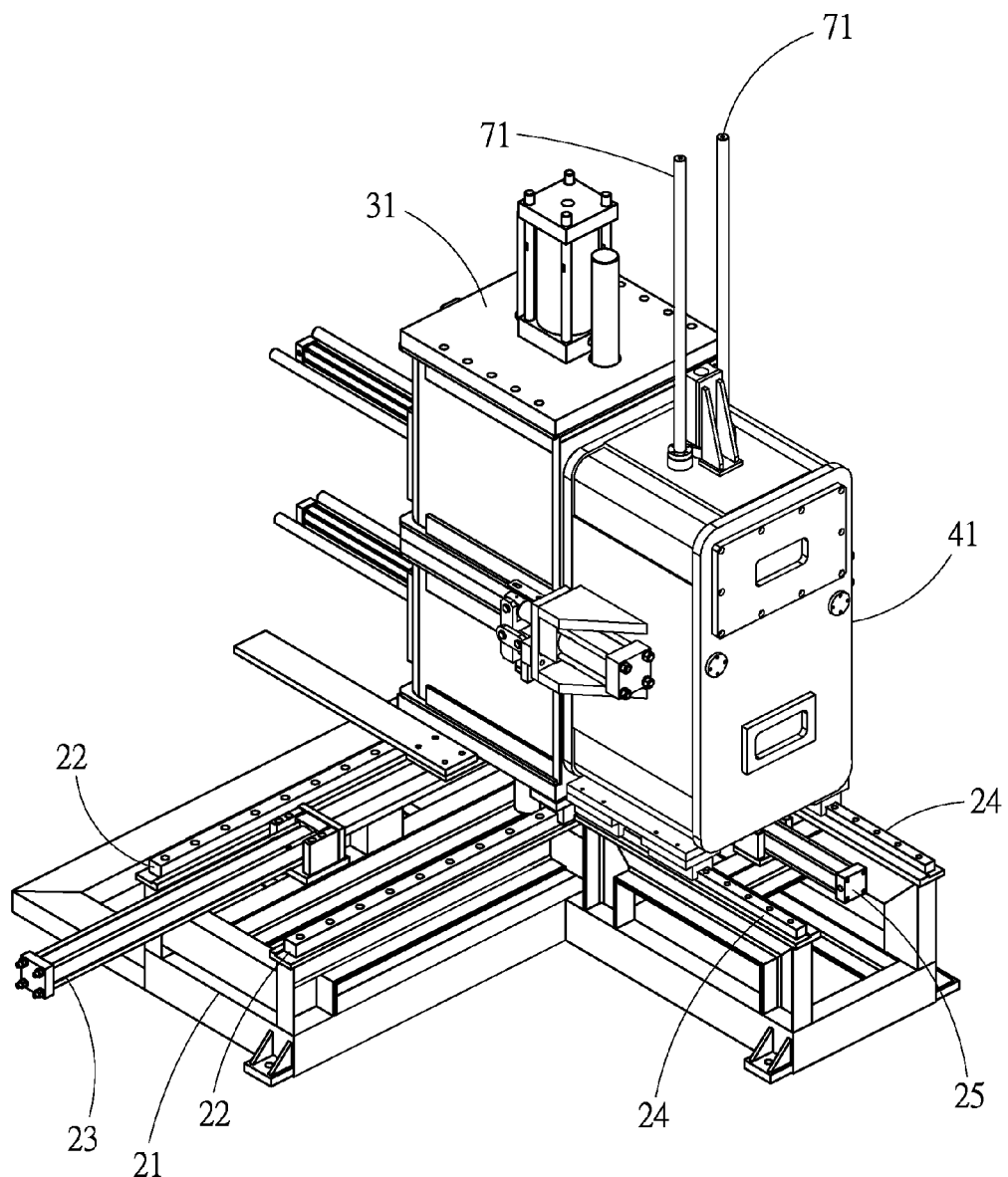
FIG. 4 is a perspective view of the first embodiment of the present invention, in which the housing section is positioned in the second position, while the body section is positioned in the third position.
Figure 5:
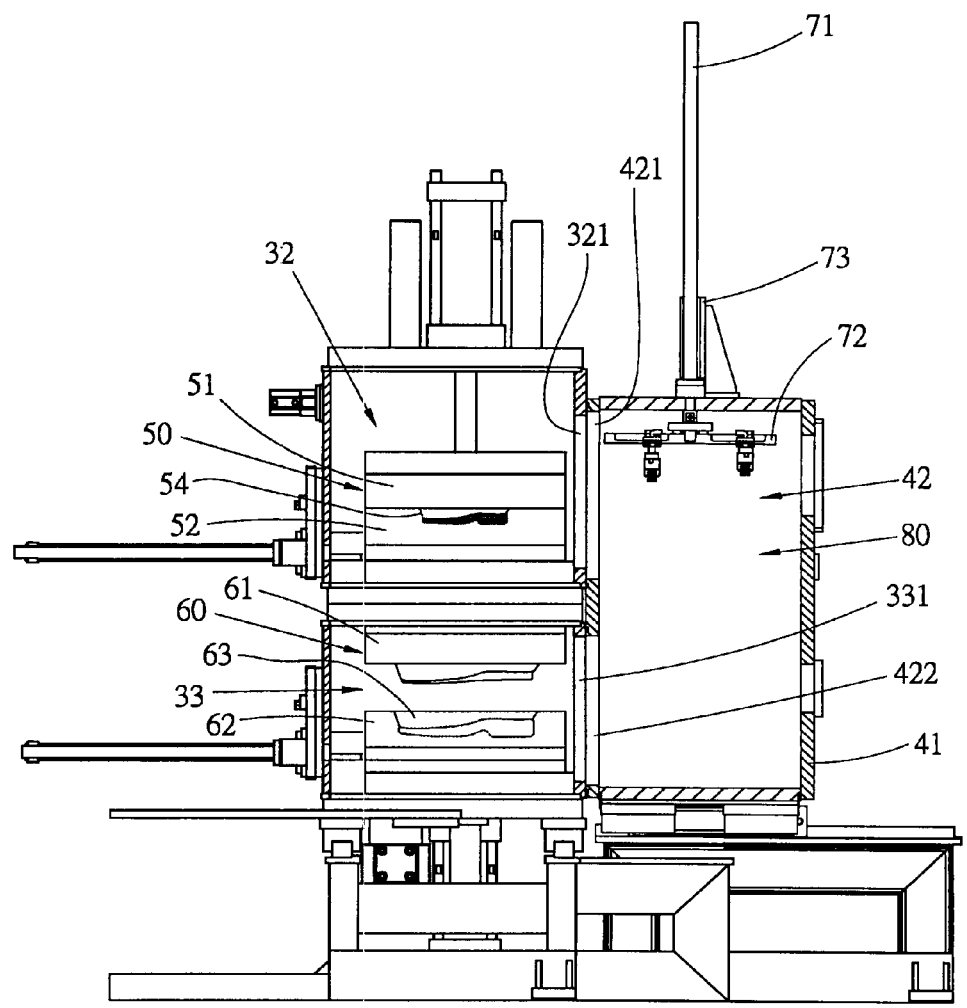
FIG. 5 is a left view of the first embodiment of the present invention, in which the first mold is closed to mold a blank.
Figure 6:
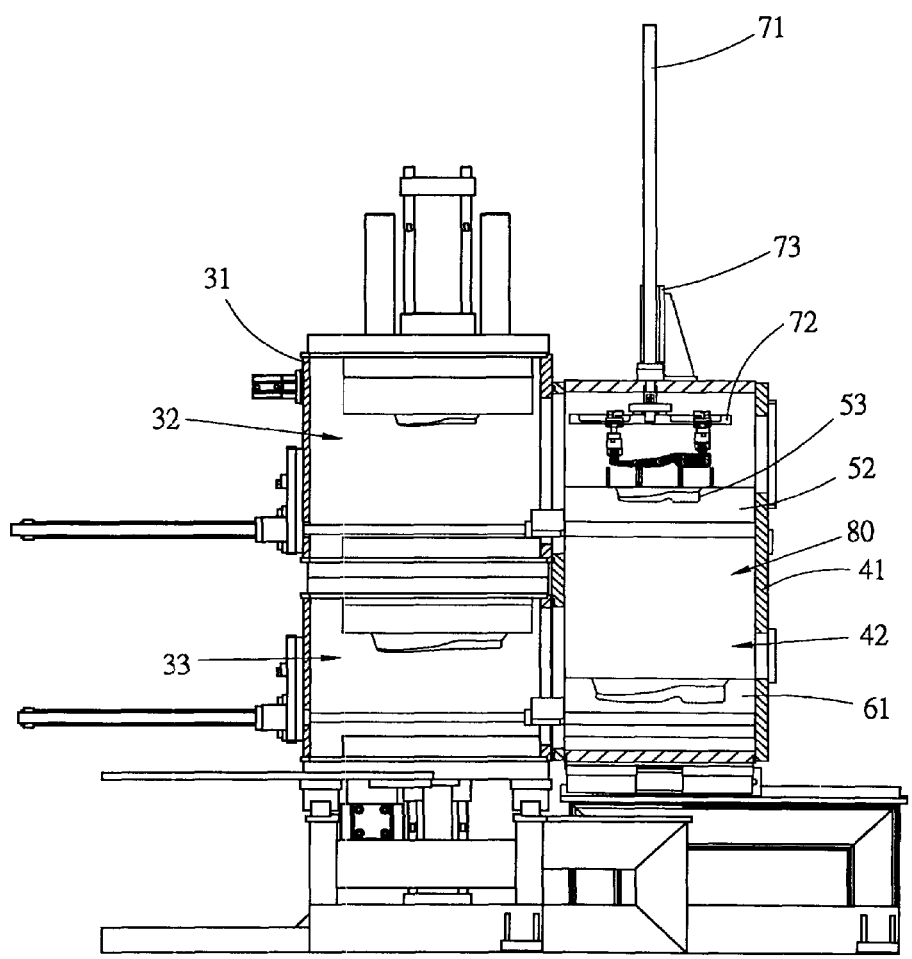
FIG. 6 is a left view of the first embodiment of the present invention, in which the movable mold plate of the first mold is transversely moved into the communication space.
Figure 7:
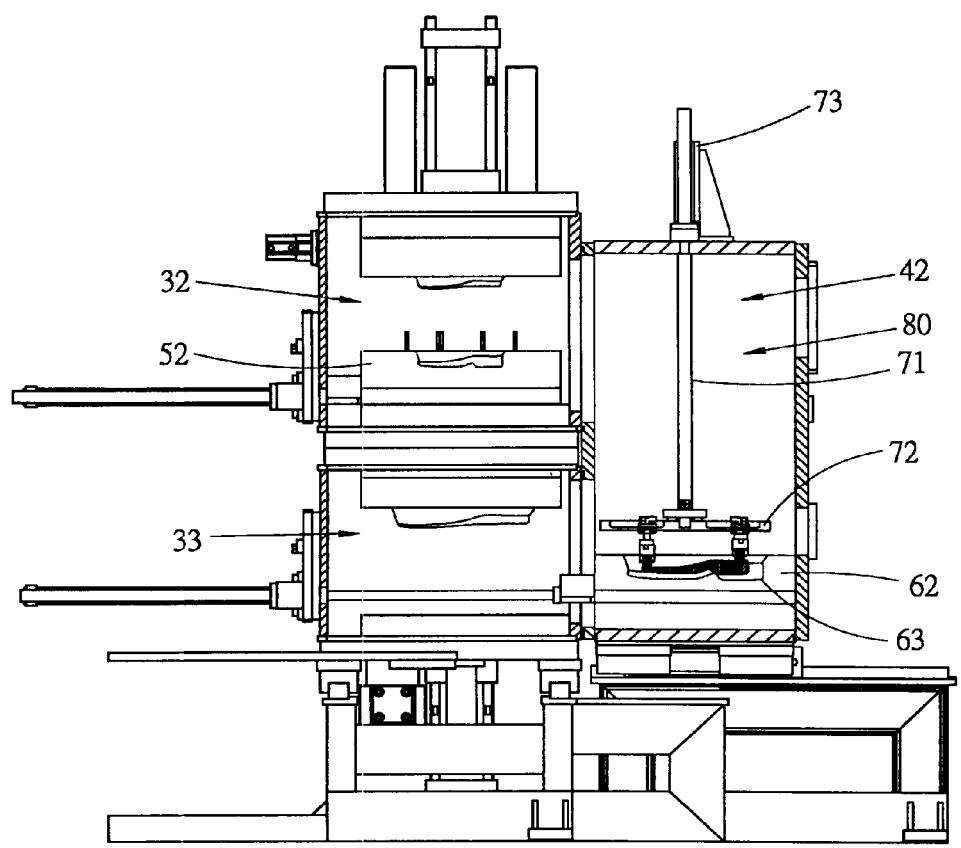
FIG. 7 is a left view of the first embodiment of the present invention, in which the blank is moved by the material transfer assembly from the first mold downward to the movable mold plate of the second mold.
Figure 8:
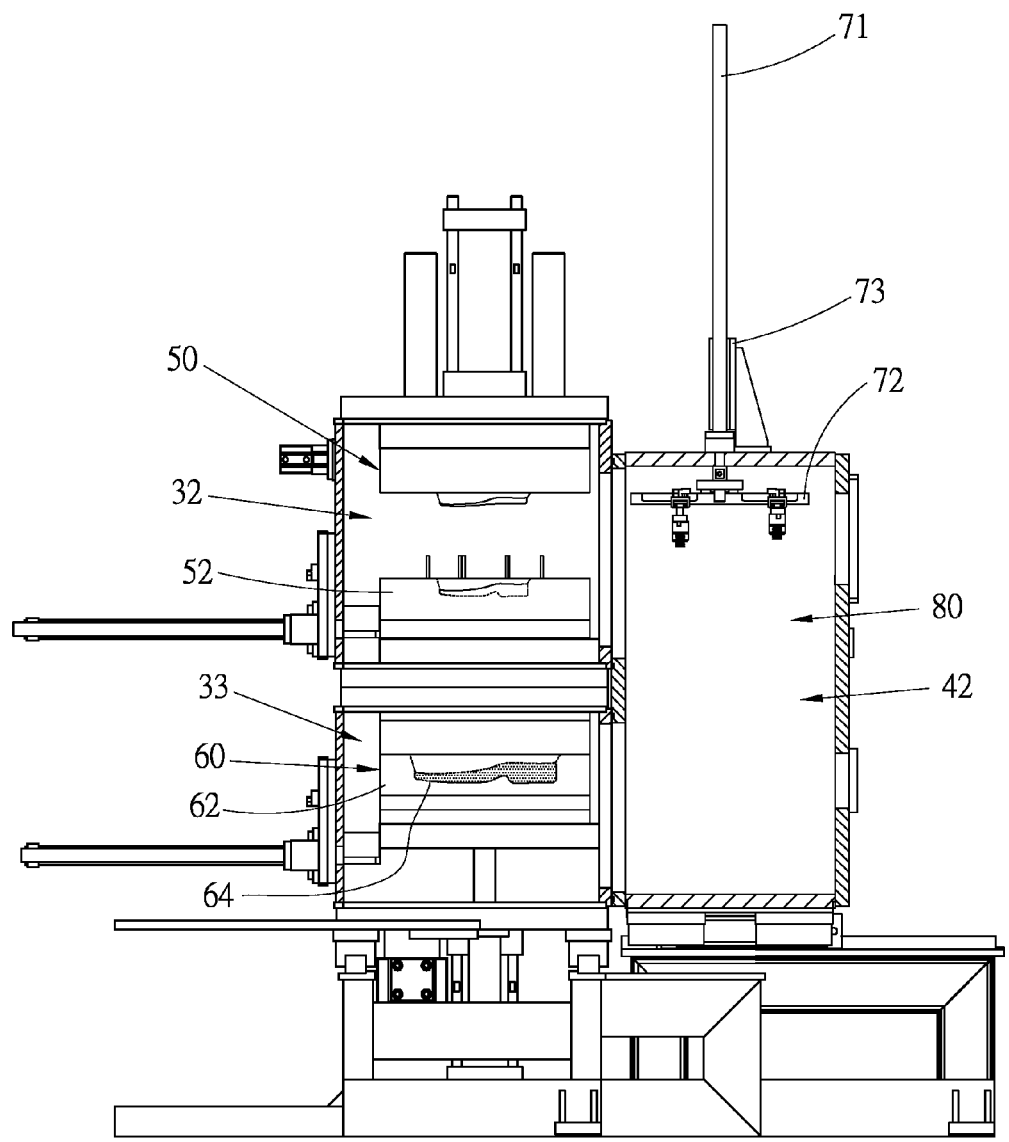
FIG. 8 is a left view of the first embodiment of the present invention, in which the second mold is closed.

Please refer to FIGS. 1 to 8. According to a first embodiment, the pressure-controlling foam molding device 10 of the present invention includes a guide section 20, a mold seat 30, a sealing assembly 40, a first mold 50, a second mold 60 and a material transfer assembly 70.

The guide section 20 has a base seat 21, a pair of first straight guide rails 22 horizontally fixedly disposed on the base seat 21 in parallel to each other, a first power member 23 formed of a hydraulic pressure cylinder fixedly disposed on the base seat 21 and positioned between the first guide rails 22 with the power output shaft in parallel to the length of the first guide rails 22, a pair of second straight guide rails 24 horizontally fixedly disposed on the base seat 21 with the length normal to the length of the first guide rails 22, and a second power member 25 formed of a hydraulic pressure cylinder fixedly disposed on the base seat 21 and positioned between the second guide rails 24 with the power output shaft in parallel to the length of the second guide rails 24.

The mold seat 30 has a housing section 31 slidably disposed on the first guide rails 22 and drivable by the first power member 23 to reciprocally move along the first guide rails 22 between a first position and a second position. The interior of the housing section 31 is partitioned into an upper first receiving space 32 and a lower second receiving space 33 corresponding to the first receiving space 32. The first and second receiving spaces 32, 33 are positioned on different levels without directly communicating with each other. A lateral face of the housing section 31 is formed with a first opening 321 and a second opening 331. The first and second receiving spaces 32, 33 communicate with the atmosphere via the first and second openings 321, 331 respectively.

The sealing assembly 40 has a body section 41 slidable disposed on the second guide rails 24 and drivable by the second power member 25 to reciprocally move between a third position and a fourth position. The body section 41 has an internal communication space 42. One side of the body section 41 is formed with two openings 421, 422. When the body section 41 is positioned in the third position, the body section 41 is adjacent to the mold seat 30 positioned in the second position to block the openings 321, 331 of the first and second receiving spaces 32, 33 and interrupt the communication paths between the first and second receiving spaces 32, 33 and the atmosphere. Under such circumstance, the openings 421, 422 of the communication space 42 mate and communicate with the openings 321, 331. In this case, the first and second receiving spaces 32, 33 communicate with each other only via the communication space 42 to form an independent and closed pressure-controlling space 80.

The first and second molds 50, 60 pertain to conventional polymer molds. The first and second molds 50, 60 are multilayer molds each of which is composed of multiple layers of stacked mold plates. The first and second molds 50, 60 are respectively used to mold a blank and shape the blank. The first and second molds 50, 60 are respectively disposed in the first and second receiving spaces 32, 33.

The first mold 50 includes a first closing mold plate 51 and a first movable mold plate 52. At least one first mold pit 53 is formed on the first movable mold plate 52 for molding a blank. The first mold pit 53 has an opening on upper side. The first closing mold plate 51 can mate with the first movable mold plate 52 to block the opening of the first mold pit 53. After the first closing mold plate 51 is mated with the first movable mold plate 52, a closed first mold cavity 54 is defined therebetween.

The second mold 60 also includes a second closing mold plate 61 and a second movable mold plate 62. At least one second mold pit 63 is formed on the second movable mold plate 62 for shaping the blank molded by the first mold 50. The second mold pit 63 has an opening on upper side. The second closing mold plate 61 can mate with the second movable mold plate 62 to block the opening of the second mold pit 63. After the second closing mold plate 61 is mated with the second movable mold plate 62, a closed second mold cavity 64 is defined therebetween.

The first and second movable mold plates 52, 62 can be horizontally transversely moved under external force. That is, the first and second movable mold plates 52, 62 can be driven by the external force to horizontally outward reciprocally move from the first and second receiving spaces 32, 33 through the corresponding openings 321, 331.

The material transfer assembly 70 includes two guide posts 71 in parallel to the gravity line. The guide posts 71 are slidably disposed on a top wall of the body section 41. Bottom ends of the guide posts 71 are positioned in the communication space 42. A material picking section 72 is fixedly disposed at bottom ends of the guide posts 71. A third power member 73 formed of a hydraulic pressure cylinder is fixedly disposed on the top wall of the body section 41. The power output shaft of the third power member 73 extends through the body section 41 to connect with the material picking section 72. Accordingly, the third power member 73 serves to provide power to make the material picking section 72 up and down reciprocally move along a moving axis in parallel to the gravity line under the guide of the guide posts 71. The material picking section 72 is a vacuum sucker pertaining to prior art and thus will not be further described hereinafter.

Figure 9A:
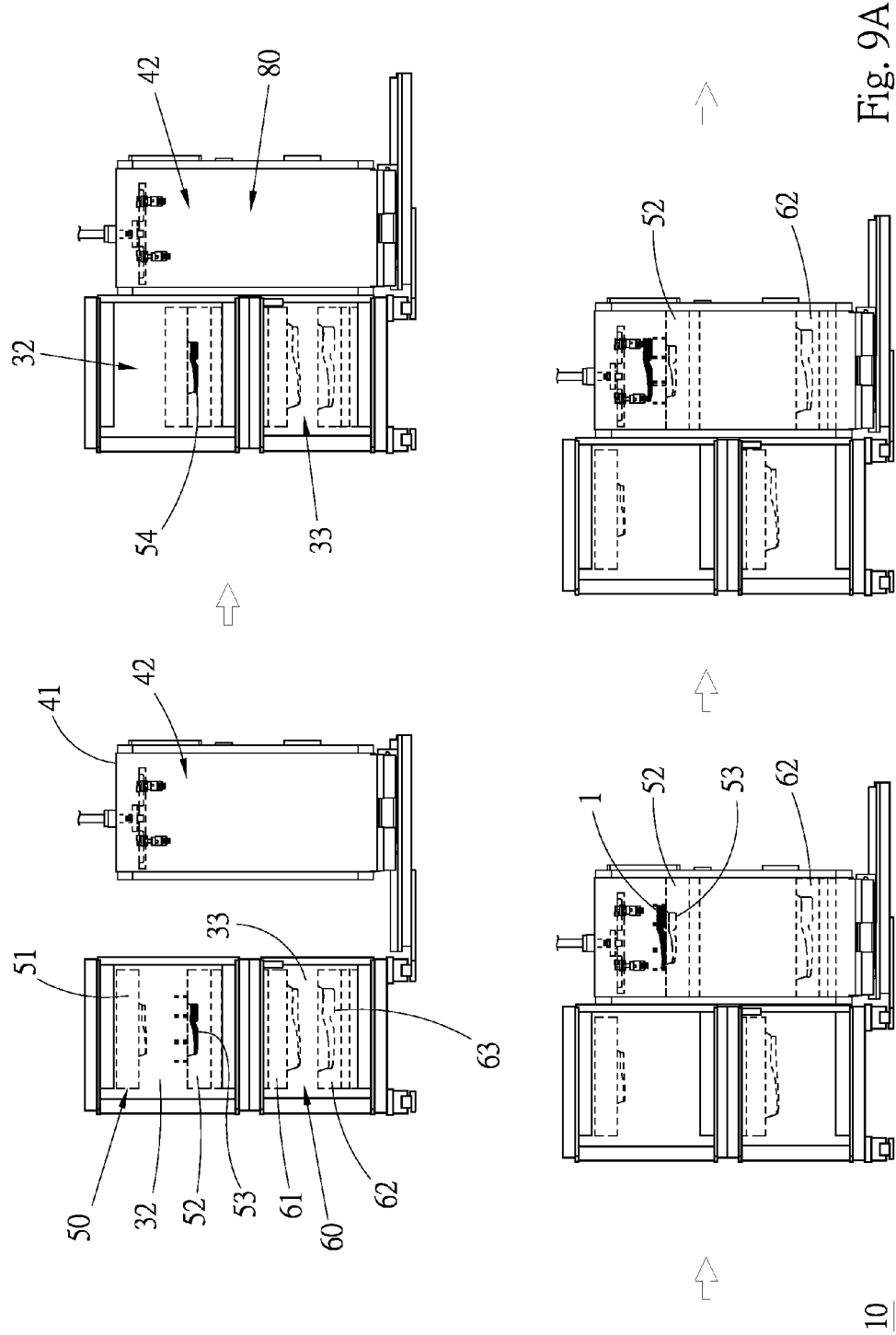
FIGS. 9A and 9B show the process of the second embodiment of the present invention.
Figure 9B:
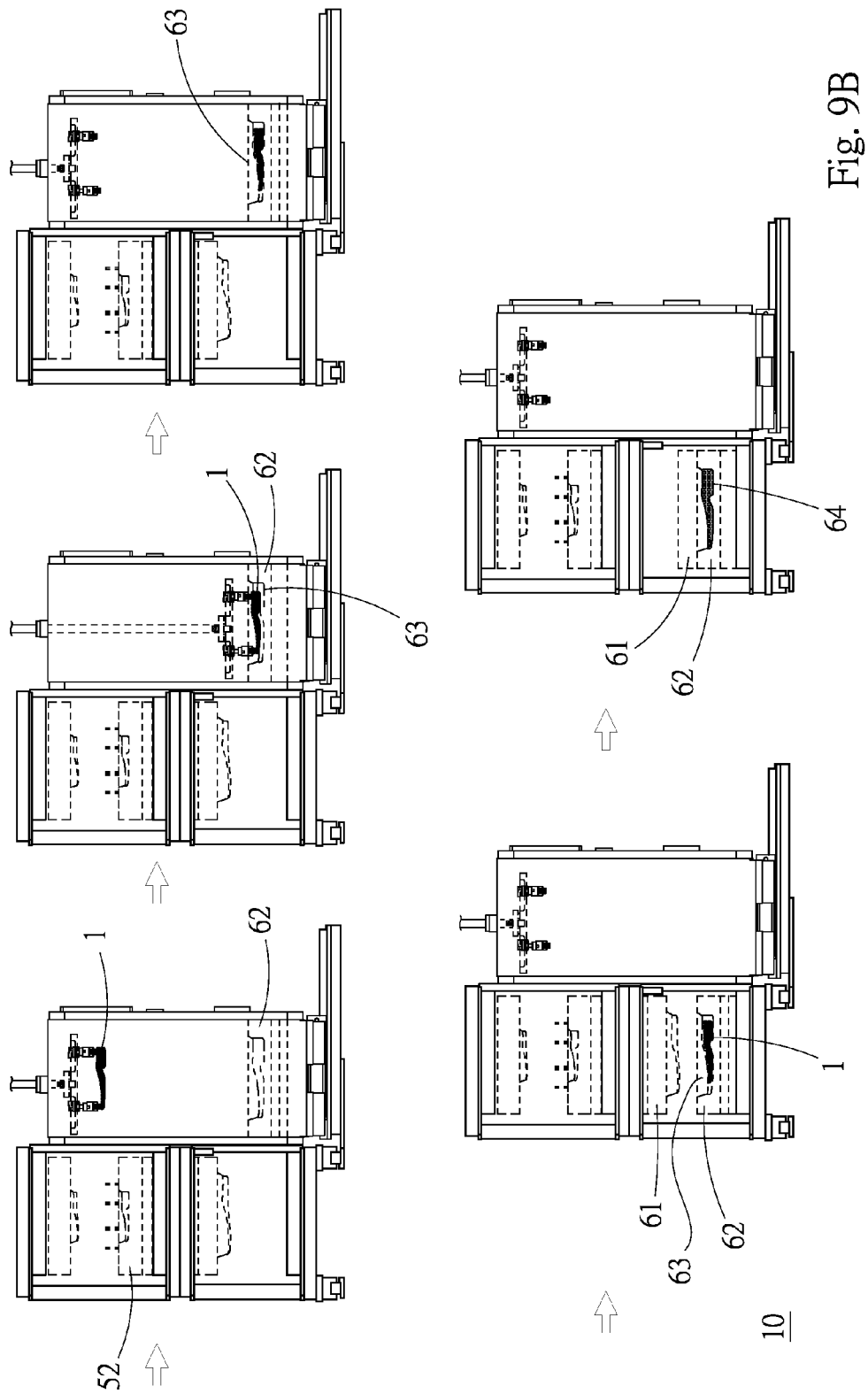
Figure 10:
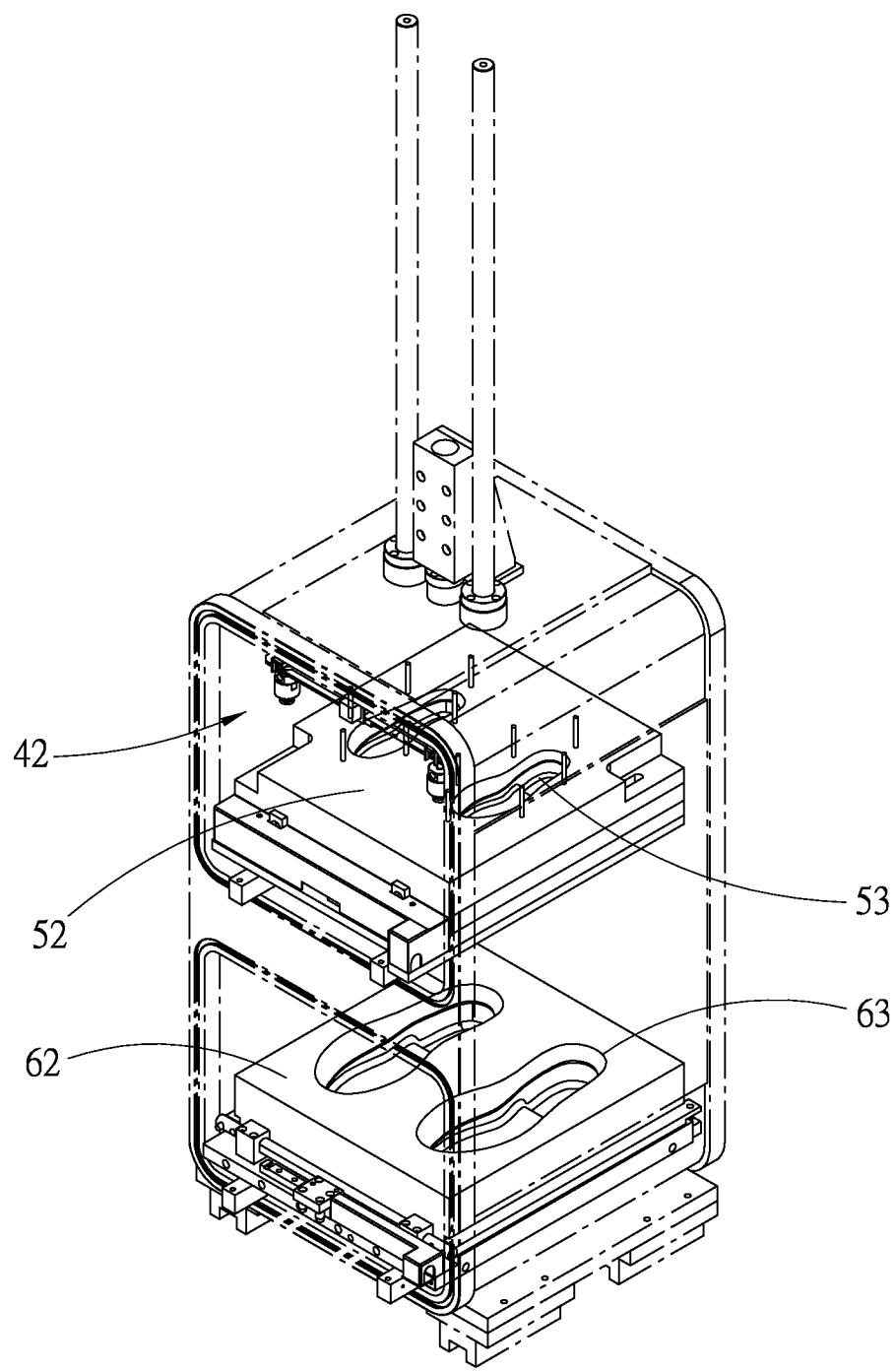
FIG. 10 is a perspective view of a part of the second embodiment of the present invention, showing that the vertical projective shape of the blank corresponds to the shape of the opening of the second mold pit.
Figure 11:
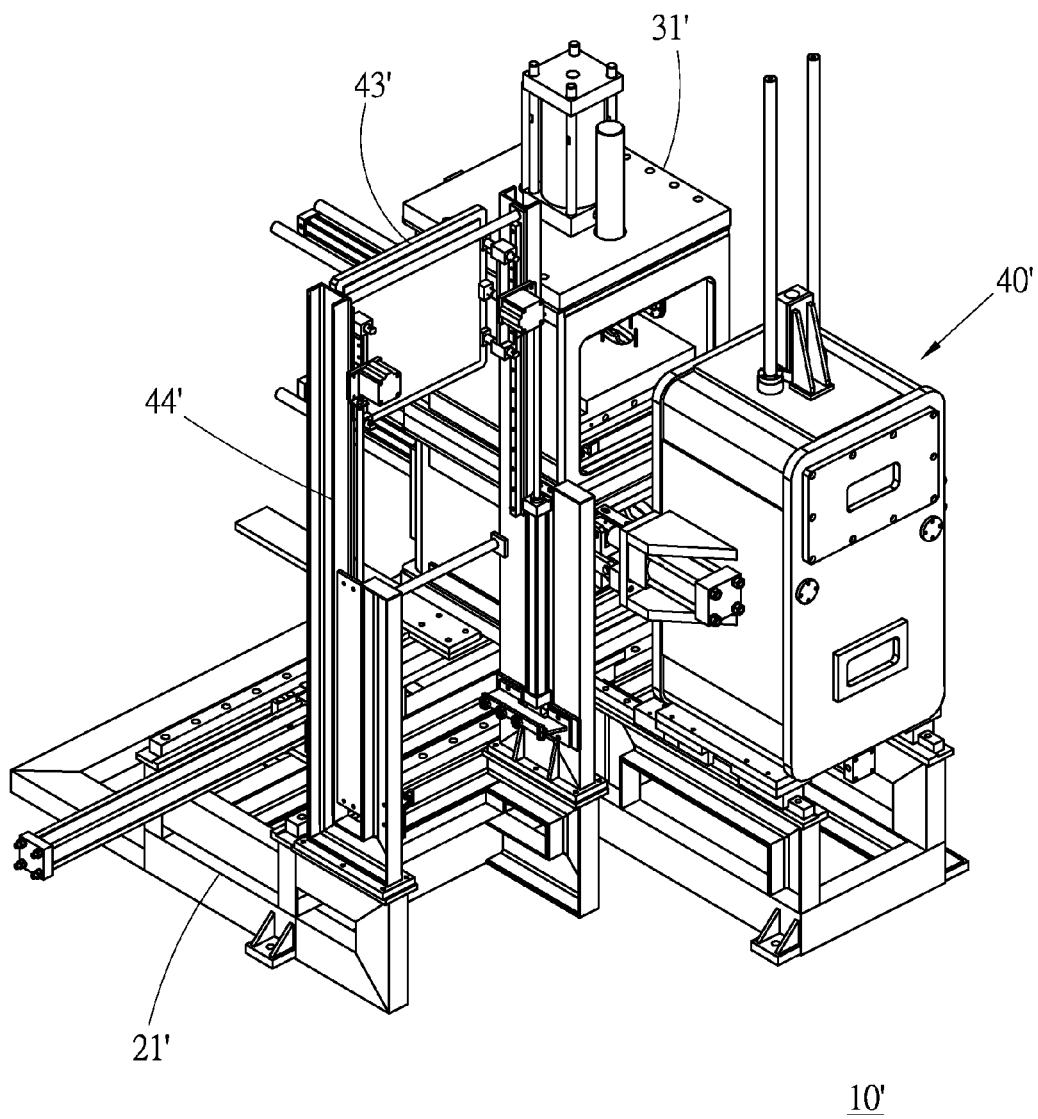
FIG. 11 is a perspective assembled view of a third embodiment of the present invention.
Figure 12:
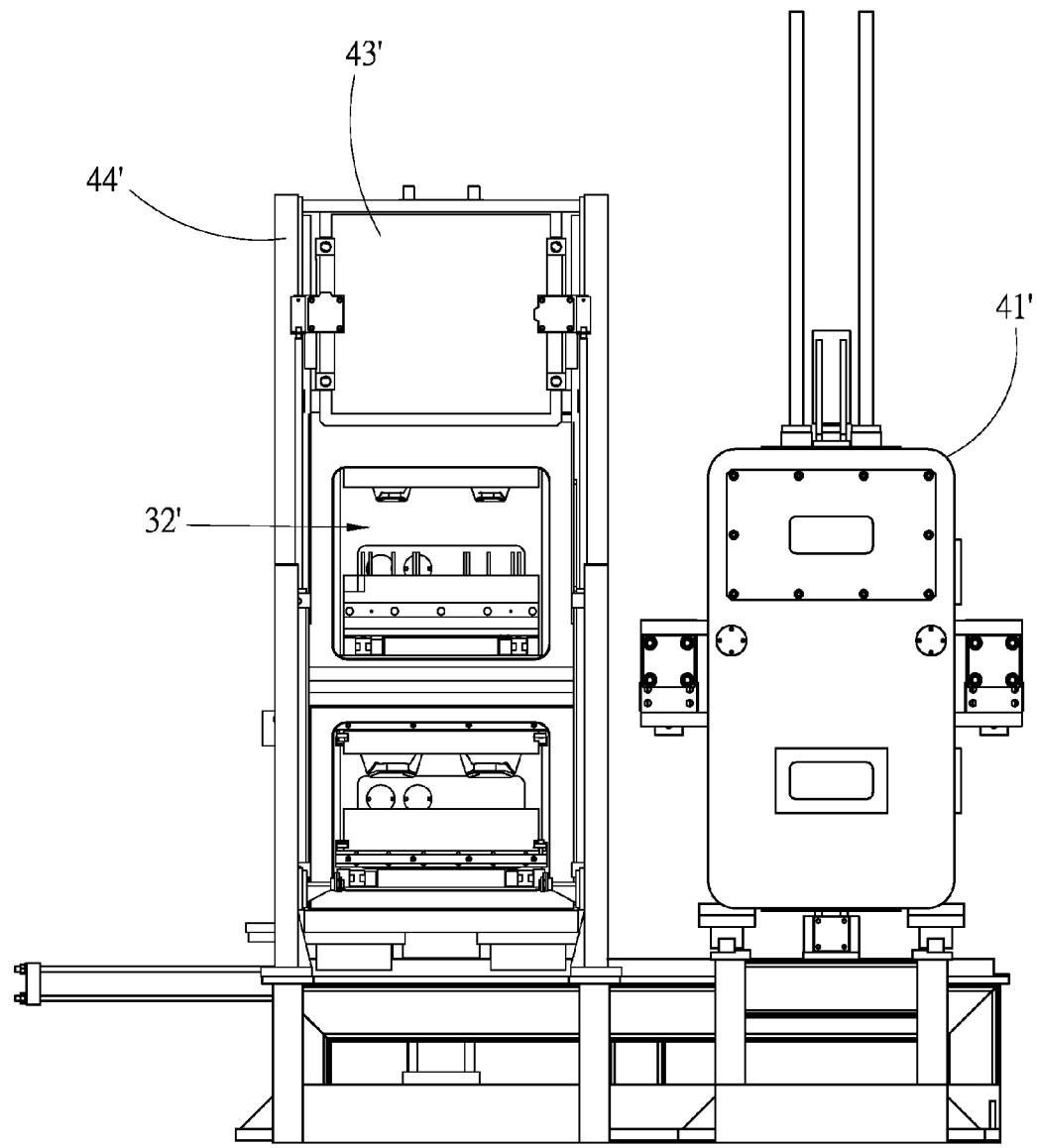
FIG. 12 is a front view of the third embodiment of the present invention.
Figure 13:
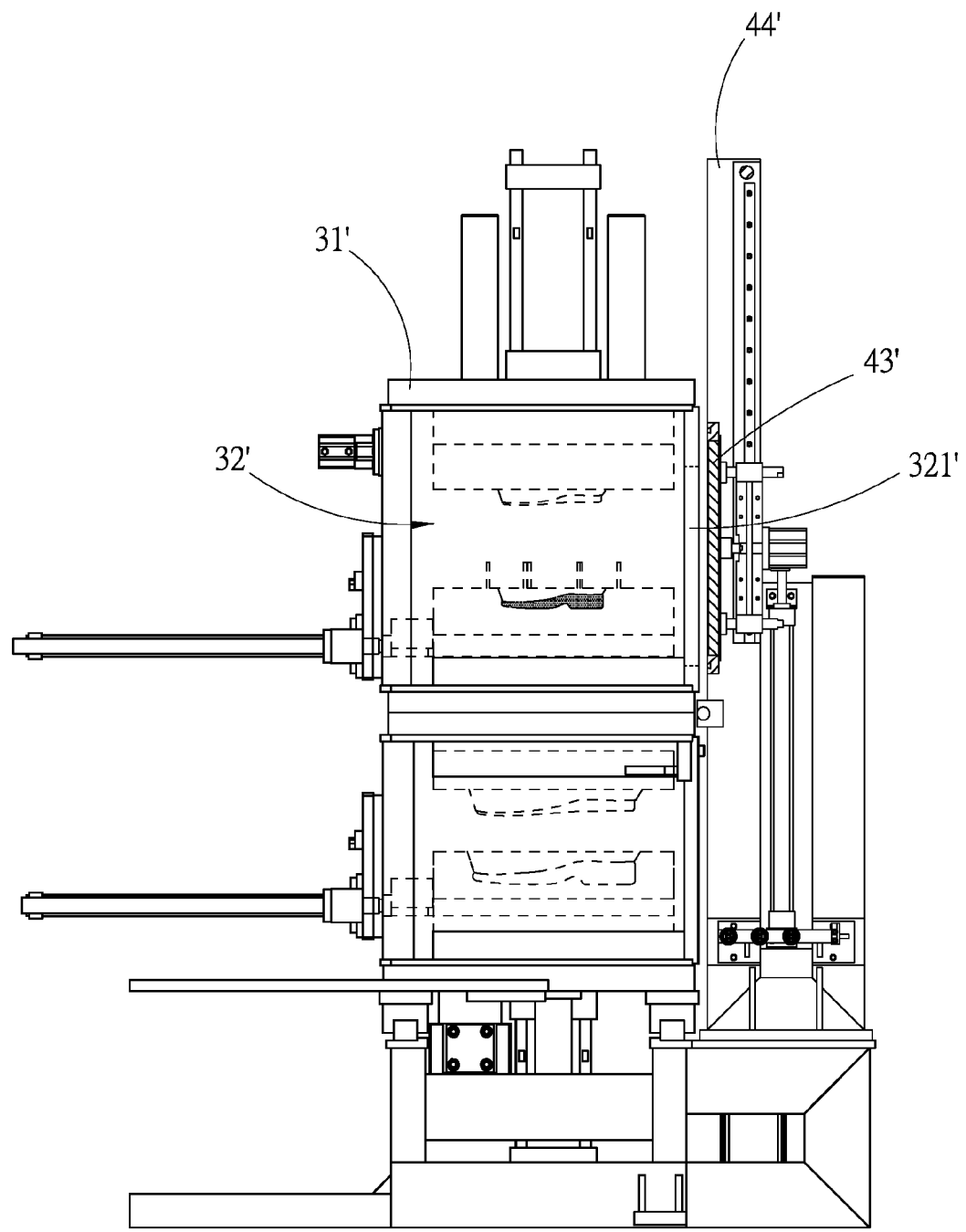
FIG. 13 is a left view of the third embodiment of the present invention, in which the cover section is moved downward to be adjacently aligned with the opening of the first receiving space.
Figure 14:
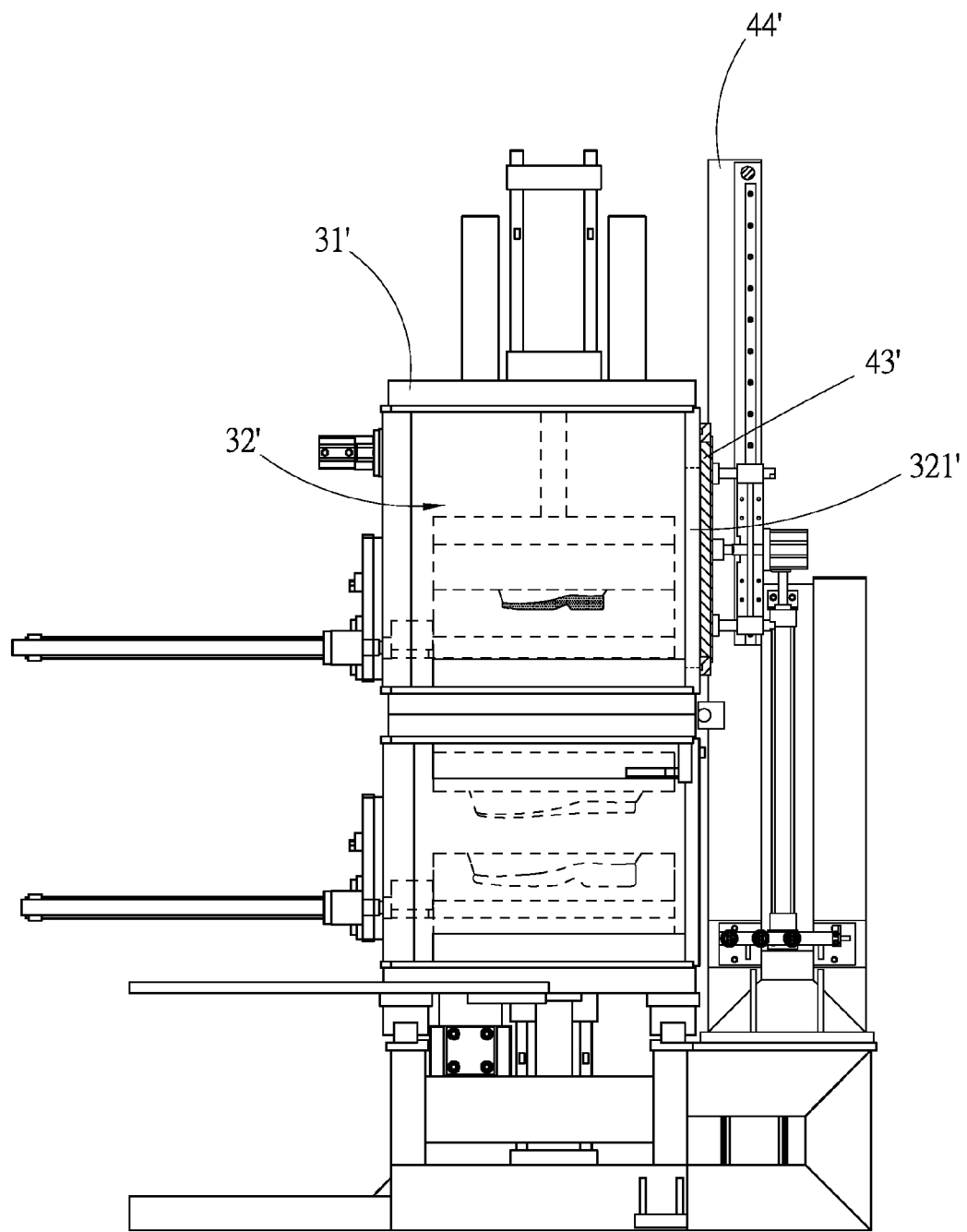
FIG. 14 is a left view of the third embodiment of the present invention, in which the cover section blocks the opening of the first receiving space to seal the first receiving space.

Please now refer to FIGS. 9A, 9B and 10. According to a second embodiment, the first embodiment of the pressure-controlling foam molding device 10 is used in the pressure-controlling foam molding method of the present invention. The pressure-controlling foam molding method includes steps of:

a. using the first mold to mold at least one blank, wherein the method of molding a blank with a mold pertains to prior art and thus this step will be only substantially described hereinafter, step a including substeps of:
  a1. first, positioning the housing section 31 in the first position with the first mold 50 open so as to place a fixed amount of polymer material into the first mold pit 53;
  a2. moving the housing section 31 from the first position to the second position and positioning the body section 41 in the third position so as to mate the first and second receiving spaces 32, 33 with the communication space 42 to form the closed pressure-controlling space 80 isolated from the atmosphere;
  a3. closing the first mold 50 in the first receiving space 32 isolated from the atmosphere and vacuum the first receiving space 32 so as to ensure that when the first mold 50 is completely closed, no air remains in the first mold cavity 54 formed of the closed first mold pit 53 in the first mold 50;
  a4. heating the polymer material in the first mold cavity 54 to form a blank 1, the blank 1 being shaped by the first mold cavity 54 to have a shape identical to that of the first mold cavity 54;
  a5. increasing the pressure of the first receiving space 32 to a mold opening pressure greater than the atmosphere, substantially, the first receiving space 32 being a part of the pressure-controlling space 80 as described in step a2 so that in this substep, the pressure of the entire pressure-controlling space 80 is increased;
  a6. opening the first mold 50 under the mold opening pressure, whereby the blank 1 molded in the previous substep foams when the first mold 50 is opened under the mold opening pressure, however, after foamed, the volume of the blank being reduced under the mold opening pressure to an extent depending on the size of the opening of the second mold pit 63 into which the blank is to be filled, in other words, the mold opening pressure only needing to be sufficient to compress the blank to such a volume as to be successfully placed into the second mold pit 53, in addition, after foamed, the blank 1 being located on an upper side of the first movable mold plate 52 on which the opening of the first mold pit 53 is positioned, the blank 1 being located in such a manner that several locating bars are upright disposed along a periphery of the opening of the first mold pit 53 to define a locating space with a volume larger than that of the first mold pit 53, whereby when the first mold 50 is opened, the blank 1 is foamed and demolded out of the first mold pit 53 to be restrained within the locating space so that the foamed and demolded blank 1 is located in a fixed position, the mold opening pressure in this substep being within a certain range of pressure value rather than a fixed pressure value, to speak more specifically, the pressure value of the mold opening pressure being first increased to a first stage of pressure value greater than the atmosphere, at this time, the first mold 50 being opened, whereby the blank molded by the first mold 50 is foamed and enlarged to bound out of the opening of the first mold pit 53 into the locating space, then, the pressure value of the mold opening pressure being decreased to a second stage of pressure value, whereby the volume of the blank 1 in the locating space is increased to make the periphery of the blank abutting against an inner periphery of the locating space, then, the pressure value of the mold opening pressure being increased to a third stage of pressure value to compress the blank 1 in the locating space to have such a volume that the blank 1 can be successfully taken out from the locating space, the pressure value of the mold opening pressure being varied, whereby under the second stage of pressure value, the periphery of the blank 1 abuts against the inner periphery of the locating space to locate the blank 1 and under the third stage of pressure value, the volume of the located blank 1 is decreased so that the blank can be easily moved out of the locating space;

b. positioning the first mold and the second mold in the same closed pressure-controlling space, in this step, a part of the first mold 50 and a part of the second mold 60 being respectively moved from the original first receiving space 32 and the original second receiving space 33 into the communication space 42 within the pressure-controlling space 80, that is, the mold opening pressure of the pressure-controlling space 80 being maintained and the first movable mold plate 52 with the blank 1 of decreased volume being transversely moved from the first receiving space 32 into the communication space 42, at the same time, the second movable mold plate 63 being transversely moved from the second receiving space 33 into the communication space 42, with the plane on which the opening of the second mold pit 63 is positioned as a projection face, the shape and position of the opening of the second mold pit 63 corresponding to the vertical projective shape and position of the blank 1;

c. moving the blank out of the opening of the first mold pit of the first mold along a moving axis in parallel to the gravity direction under a predetermined transfer pressure in the pressure-controlling space, wherein the transfer pressure can be equal to the pressure value of the mold opening pressure for decreasing the volume of the foamed blank under high pressure so as to ensure that the blank can be successfully placed into the second mold pit, to speak more specifically, in this embodiment, the transfer pressure being equal to the third stage of pressure value of the mold opening pressure, whereby in this step, the third stage of pressure value of the mold opening pressure is maintained as the transfer pressure, that is, the transfer pressure in the pressure-controlling space 80 being maintained and the material picking section 72 being used to pick up the blank from the first mold 50 and upward move the blank out of the locating space along the moving axis, then the first movable mold plate 521 being restored from the communication space 42 into the first receiving space 32;

d. maintaining the transfer pressure in the pressure-controlling space and moving the blank into the second mold pit along the moving axis with the plane on which the opening of the second mold pit is positioned as a projection face and the shape and position of the opening of the second mold pit corresponding to the vertical projective shape and position of the blank, in this step, after the blank 1 is picked up and located by the material picking section 72 and upward moved along the moving axis, the blank 1 being suspended above the second mold pit 63 and kept in a position and state specified by the locating space, whereby the vertical projective shape and position of the blank 1 correspond to the shape and position of the opening of the second mold pit 63, in this step, the third power member 73 providing power to drive the material picking section 72 to move downward along the moving axis so as to move the blank 1 into the second mold pit 63, then the material picking section 72 releasing the blank 1 to position the blank 1 in the second mold pit 63, in the meantime, in order to ensure that the temperature of the blank 1 will not excessively drop during the transfer, suitable heating means being disposed on inner wall face of the communication space 42 to provide heat for the blank 1 during transfer, whereby the surface temperature of the blank 1 will not excessively drop during the transfer so as to ensure a stable quality in the successive shaping process; and e. shaping the blank, step e including substeps of:
  e1. restoring the second movable mold plate 62 with the blank 1 from the communication space 42 into the second receiving space 33;
  e2. closing the second mold 60 in the second receiving space 33 and vacuuming the second receiving space 33, as aforesaid, the vacuuming operation needing to be completed at latest when the second mold 60 is completely closed so as to prevent air from remaining in the second mold cavity 64 formed of the second mold pit 63 after closed; and
  e3. cooling and shaping the blank in the second mold cavity 64.

According to the pressure-controlling foam molding method of the present invention, when transferring the blank 1, when blank 1 is simply moved along the moving axis in parallel to the gravity line in a straight linear moving path in the direction of gravity. Accordingly, the blank 1 can be stably transferred without displacement. Before moved, the blank 1 is located. This helps in ensuring that the blank 1 can be successfully filled into the second mold pit 63. In contrast, in the conventional technique, the blank is likely to displace to cause decrease of the ratio of good products. In the present invention, the moving path of the blank is in the direction of gravity so that the blank can be stably moved in one single direction to ensure the quality of the product.

Moreover, in the first embodiment, the first receiving space 32 communicates with the second receiving space 33 via the communication space 42 and is a part of the pressure-controlling space 80. Therefore, when sealing the first receiving space 32 to suck away the air, it is necessary to vacuum the entire pressure-controlling space 80 so as to close the first mold 50 in a vacuumed environment. As a result, more energy and time are consumed. In order to reduce waste of energy, FIGS. 11 to 14 show a third embodiment of the present invention to solve the above problem.

The third embodiment of the pressure-controlling foam molding device 10' of the present invention is substantially identical to the first embodiment. The third embodiment is only different from the first embodiment in that the first receiving space 32' can be solely sealed and isolated from the atmosphere so as to save energy.

To speak more specifically, in addition to the components of the first embodiment, the sealing assembly 40' further includes a cover section 43' in the form of a board body. The cover section 43' is mounted on the base seat 21' via a support section 44' in alignment with and in parallel to the body section 41. That is, the cover section 43' is correspondingly disposed at the other end of the first guide rails 22' and is drivable by a power source to up and down and back and forth move. Accordingly, when an operator uses the pressure-controlling foam molding device 10' to perform the foam molding process, the blank can be molded with the housing section 31' positioned in the first position. Therefore, it is unnecessary to move the housing section 31' to the second position for the foam molding operation as in the first embodiment.

In other words, when an operator uses the pressure-controlling foam molding device 10' to perform the blank molding process, the cover section 43' is first moved downward to a position in alignment with the opening of the first receiving space 32' and then moved backward to tightly attach to the opening 321' of the first receiving space 32' so as to solely isolate the first receiving space 32' from the atmosphere in the first position. In this case, the room needing to be vacuumed is smaller than that of the first embodiment so that the energy can be saved.

Furthermore, in both the first and third embodiments, the body section is straight linearly moved. In practice, alternatively, the technique of the present invention is also applicable to a circular disc moving form. The circular disc moving technique pertains to the prior art employed in the conventional disc-type injection molding machine. Therefore, the conventional circular disc moving technique will not be detailedly described hereinafter and FIG. 15 only shows a fourth embodiment of the present invention, which is combined with the conventional circular disc moving technique.

Figure 15:
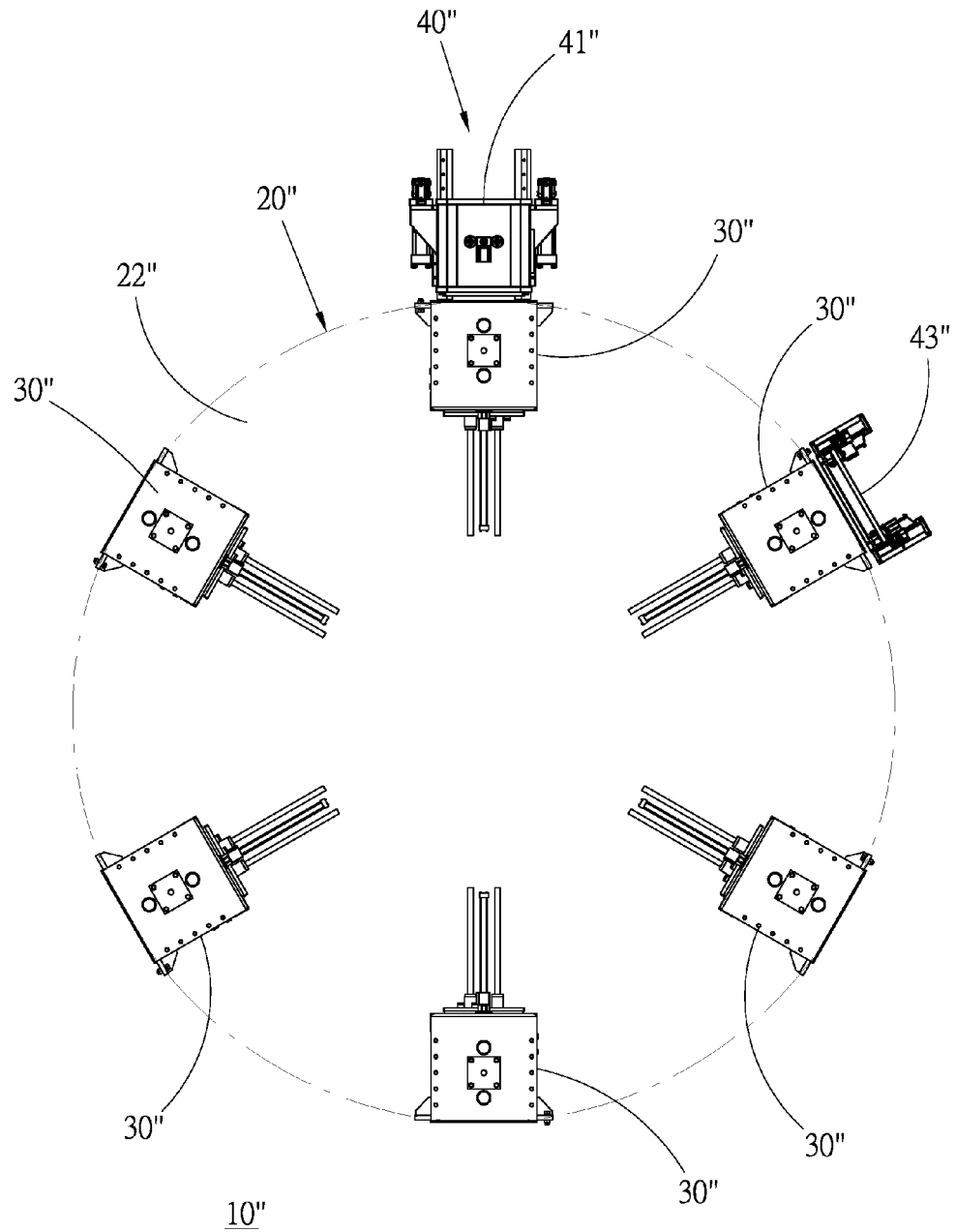
FIG. 15 is a top view of a fourth embodiment of the present invention.

Please refer to FIG. 15. The fourth embodiment of the pressure-controlling foam molding device 10" of the present invention is only different from the third embodiment in that the linear moving structure of the third embodiment is replaced with a disc-type circularly moving technique. Accordingly, in this embodiment, the guide section 20" includes a conventional circular carrier tray 22" and a first power member (not shown) for driving the circular carrier tray 22" instead of the first guide rails and the first power member of the first and third embodiments. In addition, the body section 41" and the cover section 43" of the sealing assembly 40" are respectively disposed at different working stations around the carrier tray 22". Also, multiple mold seats 30" and the same number of first and second molds are disposed on the carrier tray 22". Under such circumstance, by means of rotating the carrier tray 22", the different mold seats 30" and the first and second molds disposed therein are sequentially circularly moved between the different working stations. Accordingly, the sealing assembly 40" of the pressure-controlling foam molding device 10" can be mated with the different mold seats 30" in sequence to perform the polymer foam molding operation.

The above embodiments are only used to illustrate the present invention, not intended to limit the scope thereof. Many modifications of the above embodiments can be made without departing from the spirit of the present invention.

What is claimed is:

1. A pressure-controlling foam molding method comprising steps of:
   - a.1. preparing a mold seat, drivable over a pair of parallel first guide rails by a first power member installed therebetween, including
     - a first receiver with a first opening; and
     - a second receiver with a second opening, placed on a different level to correspond to the first receiver; and
   - a.2. positioning a first mold and a second mold in the first receiver and the second receiver, respectively,
     - wherein the first mold is a multilayer mold, including
       - a first mold plate, having at least one first mold pit for molding a blank; and
       - a first closing mold plate, for mating with one of the first mold plates; and
     - the second mold also is a multilayer mold, including
       - a second mold plate, having at least one second mold pit for shaping the blank, and
       - a second closing mold plate for mating with one of the second mold plates;
   - b. using the first mold to mold at least one blank;
   - c. moving the first mold plate and the second mold plate in a direction parallel to a pair of second guide rails, which run perpendicular to the first guide rails and are slidably disposed with a body section, said body section powered by a second power member, through the first opening and the second opening, respectively, into an upper opening and a lower opening of a closed pressure-controlling space, respectively, wherein the pair of parallel first guide rails, the first power member, the pair of second guide rails, and the second power member are all installed on a base seat; and
     the pressure-controlling space is enclosed by a body section including
       - a top wall with two guide posts vertically disposed thereon, and two lower ends of the two guide posts positioned inside the pressure-controlling space;
   - d. keeping a pressure in the pressure-controlling space at a predetermined transfer pressure and under a transfer pressure environment, moving the blank out of the first mold pit of the first mold plate along a moving axis in parallel to gravity direction; and
   - e. with the plane on which the opening of the second mold pit is positioned as a projection face and with the shape and position of the opening of the second mold pit corresponding to the vertical projective shape and position of the blank, moving the blank into the second mold pit of the second mold plate along the moving axis.

2. The pressure-controlling foam molding method as claimed in claim 1, wherein the transfer pressure is such as to make the blank foam to a volume approximately equal to the capacity of the second mold pit.

3. The pressure-controlling foam molding method as claimed in claim 1, wherein the transfer pressure is such as to make the blank foam to a volume smaller than the capacity of the second mold pit.

4. The pressure-controlling foam molding method as claimed in claim 1, wherein step d includes substeps of: restoring the first movable mold plate into the first receiver.

5. The pressure-controlling foam molding method as claimed in claim 4, wherein the first mold is opened in an environment with a pressure greater than the atmosphere, whereby when opening the first mold, the extent to which the blank foams is limited and after foamed, the blank is compressed in volume.

6. The pressure-controlling foam molding method as claimed in claim 1, further including restoring the second movable mold plate into the second receiver.

7. The pressure-controlling foam molding method as claimed in claim 6, further including closing the second mold in the second receiving space and sucking away the air in the pressure-controlling space to vacuum the pressure-controlling space when the second mold is closed.

* * * * *